United States Patent Office 3,078,833
Patented Feb. 26, 1963

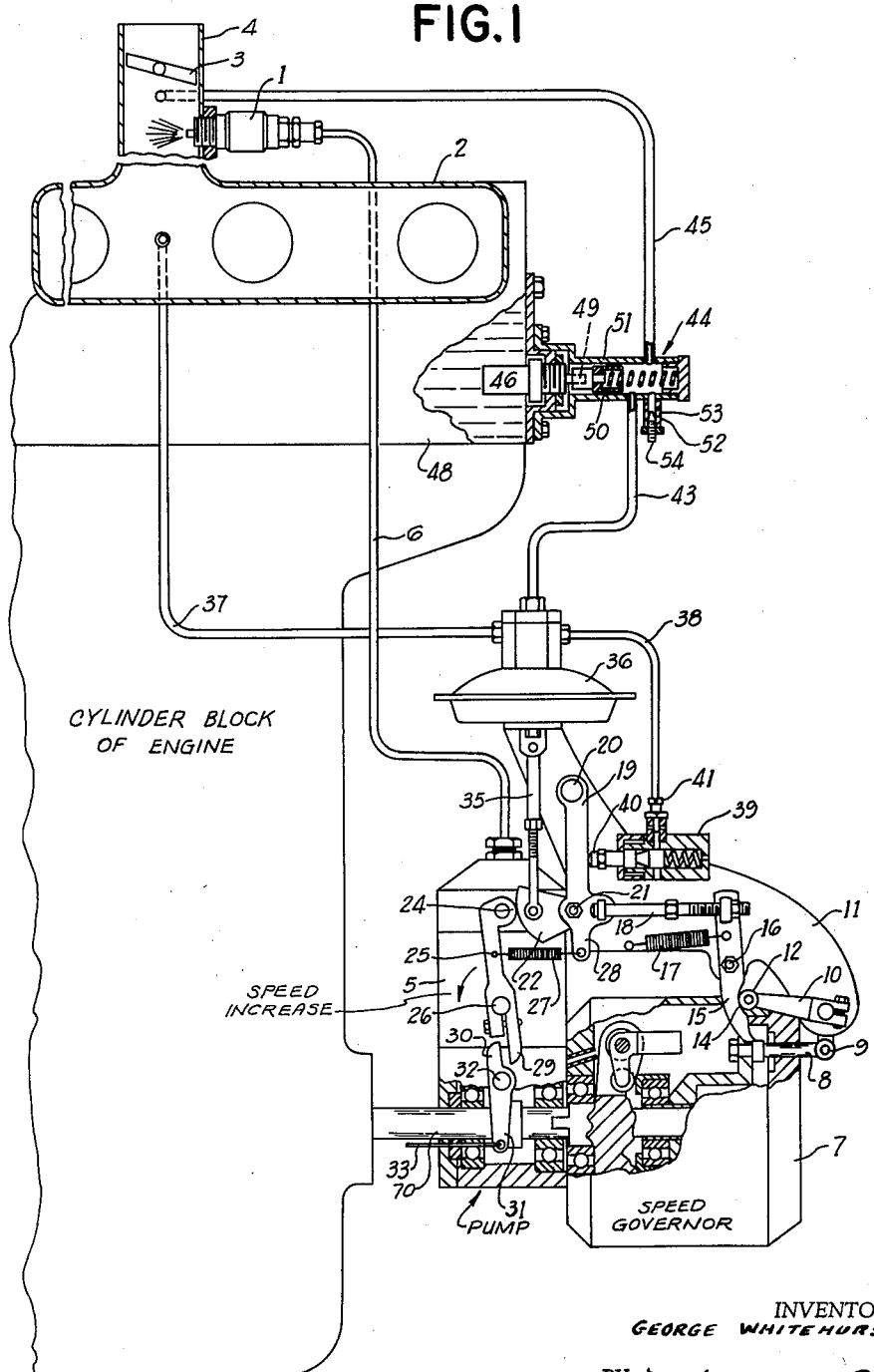

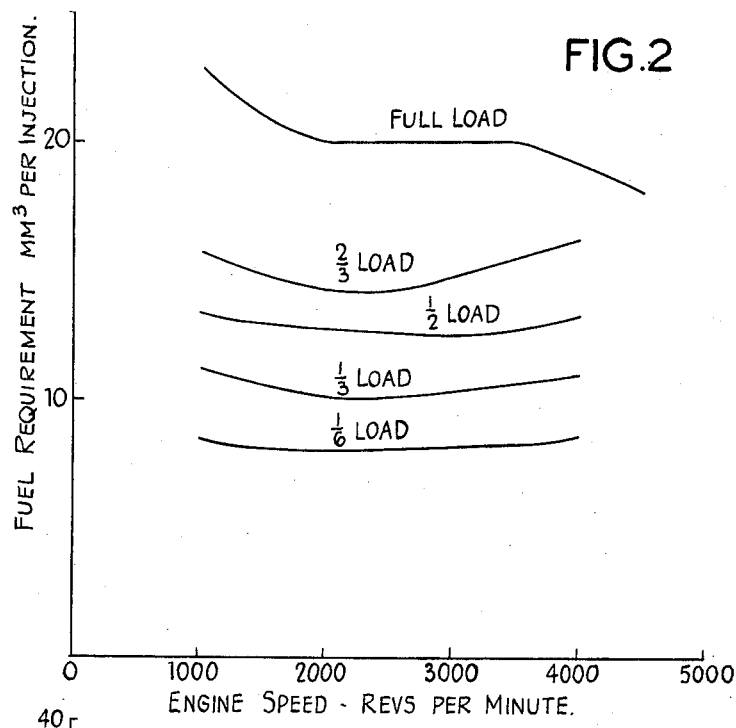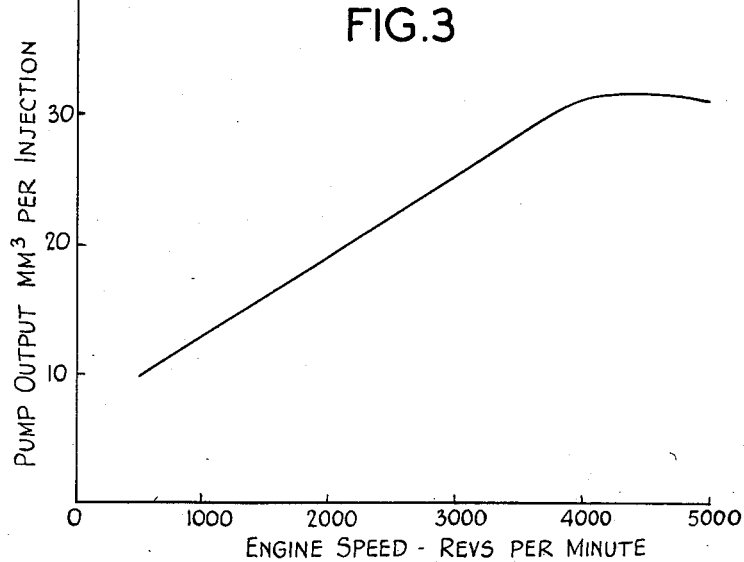

3,078,833
FUEL INJECTION CONTROL SYSTEMS FOR
INTERNAL COMBUSTION ENGINES
George Whitehurst, 37 Merton Road, Harrow, England
Filed Feb. 21, 1961, Ser. No. 90,853
Claims priority, application Great Britain Feb. 22, 1960
14 Claims. (Cl. 123—119)

This invention relates to an arrangement for injecting controlled quantities of fuel into the cylinders of internal combustion engines.

According to the present invention there is provided an arrangement for injecting controlled quantities of fuel into the air manifold of an internal combustion engine, wherein a pump is arranged to inject fuel into said air manifold via at least one nozzle arranged in the wall thereof, and wherein the output of the pump is controlled in accordance with the full load requirements of the engine, by first means responsive to engine speed, and by second means responsive to a combination of engine speed and the pressures obtaining in the manifold in accordance with the part load requirements of the engine, both said means being interdependent and so arranged that, when the engine is operating at part load, the pump output is controlled by said first and second means, and that, when the engine is operating at full load, the pump output is controlled by said first means only.

Conveniently, the first means comprise a cam and lever mechanism arranged to move an output control lever of the pump in response to movements of an engine governor, such as a pendulum-type governor which is itself responsive to engine speeds, while the second means comprise a diaphragm unit responsive to pressure obtaining in the manifold, the diaphragm of such unit being arranged to move the pump output control lever through a cam and linkage mechanism.

Preferably, the pump output control lever has a cam follower coacting with the cam of the cam and linkage mechanism associated with the diaphragm unit, such cam being controlled through a linkage mechanism and the cam and lever mechanism associated with the engine governor.

One example of the invention relates to an arrangement which, with the aid of a single pumping element and in the absence of a distributing device, is capable of feeding multicylinder engines with controlled quantities of fuel through one injection nozzle. However, the invention is equally applicable when using single or multiple pumping elements feeding a multiplicity of injection nozzles through a distributing device.

In order to enable the invention to be more readily understood, reference will now be made to the accompanying drawings, which illustrate diagrammatically and by way of example one embodiment thereof, and in which:

FIGURE 1 shows an arrangement for controlling the quantities of fuel injected into the cylinders of an internal combustion engine;

FIGURE 2 is a graph of the fuel requirements of an engine plotted against engine speed for various loads; and FIGURE 3 is a graph of the delivery of an injection pump plotted against engine speed.

Referring now to FIGURE 1 of the drawings, there is shown a fuel injection system comprising an injector nozzle 1 screwed into the air manifold 2 of an internal combustion engine (not shown) at a location just after a throttle plate 3 in the direction of air flow through an air inlet pipe 4. The nozzle 1 is supplied with fuel from a pump 5, which is a reciprocating pump such as that described Patent No. 2,745,349, through a pipe 6.

It is found that the fuel requirements of an engine vary according to whether:

(a) The engine is operating at full load,
(b) The engine is operating at part load,
(c) The engine is warming up, or
(d) The engine has to be started from cold.

In general, the full load fuel requirements of the engine in quantities per engine firing cycle plotted against engine speed follow a gradually decreasing curve which passes through a region where the fuel requirements are a constant for a wide range of engine speeds as shown in FIGURE 2. FIGURE 2 also shows that when the engine is operating at part load, the fuel requirements of the engine in quantities per engine firing cycle plotted against engine speed follow a curve which passes through a minimum value, the exact position of which depends on several factors including the degree of opening of the throttle. The output of the pump plotted against the pump speed follows a gently rising curve which reaches a maximum near the maximum pump speed and then begins to fall off as shown in FIGURE 3.

In order to obtain optimum fuel output from the pump in accordance with the engine requirements, it is necessary to provide control means for this purpose. The control means include a governor responsive to engine speeds arranged in a housing 7 fixed to the pump 5. The governor is connected to a cam shaft 70 of the engine and weights 72 thereof are shifted in accordance with the cam shaft driving speed. The weights 72 are connected to a thrust pin 8 which is moved (to the right) outwardly of the housing 7 upon an increase in speed, of the engine and outward movement of weights 72. The thrust pine 8 contacts a roller 9 mounted at the end of one arm of a bell crank 10 pivoted in a bracket 11. The end of the other arm of the bell crank carries a roller which acts as a cam follower and which bears against a cam surface 14 formed on a cam arm 15. The cam arm 15 is pivoted at 16 on the bracket 11, and a spring 17, mounted between the bracket 11 and the cam arm 15 urges the cam surface into contact with the cam follower roller 12. The end of the cam arm 15 remote from the cam surface 14 is connected to an adjustable link 18 which in turn is pivotally connected to an arm 19. The arm 19 is pivoted at 20 on the bracket 11, and has pivoted thereon at 21 a part load cam 22. The part load cam 22 bears against a cam follower 24 mounted at one end of a lever 25 which controls the output of the pump 5, and which is pivoted to the pump 5 at 26. A spring 27 connected between the pump output control lever 25 and an extension 28 of the arm 19 urges the cam follower 24 and the cam 22 into contact with one another.

The pump output control lever 25 has an extension 29 which can be engaged by an extension 30 on an arm 31 pivoted at 32 to the pump 5. The arm 31 is connected by a cable 33 to the cold start enrichment control of the engine for use in starting the engine, as will be more fully explained hereinafter.

The part load cam 22 is connected by an adjustable operating link 35 to the diaphragm of a diaphragm unit 36, the link 35 being pivotally mounted on the cam 22 and being pivotally attached to the diaphragm. The control side of the diaphragm of the unit 36 is connected by a pipe 37 to manifold 2 of the engine, so that the control side of the diaphragm will be influenced by the reduced pressures obtaining in the manifold when the engine is in operation. A pipe 38 leads from the control side of the diaphragm to a bleed valve 39 having an adjustable operating member 40 which can be actuated by the arm 19. The bleed valve 39 also has a bleed adjustment screw 41.

A pipe 43 leads from the diaphragm unit to a fast idle and enrichment control device 44, which in turn is connected by a pipe 45 to the air inlet pipe 4 at a location between the throttle plate 3 and the outlet of the nozzle 1.

The fast idle and enrichment control device comprises a cylindrical thermostatic control element 46 secured in the cylinder head 48 of the engine, so as to be in contact with the cooling water in the cylinder head (part of the cylinder head being diagrammatically illustrated in FIGURE 1). Alternatively the fast idle and enrichment control device may be positioned at any other location where the cylinder head water temperature can be sensed. The thermostatic control element 46 may consist of a cylinder containing a rubber insert, the space between the cylinder wall and the rubber insert being charged with a wax having a high coefficient of expansion. The thermostatic control element cylinder also contains a central thrust rod 49 connected to a slide valve member 50 loaded by a spring 47 and movable in a cylindrical housing 51 to which the pipes 43 and 45 are connected. The slide valve member is arranged to be movable so as to close the pipes 43 and 45, and a stub pipe 52 arranged diagrammatically opposite the pipe 45. The stub pipe 52 is open to the atmosphere through a port 53 and contains an adjusting screw 54 for varying the port 53.

The pump output control lever 25 is so arranged that anti-clockwise movement of the lever about its pivot 26 (as shown in the drawing) causes more fuel to be pumped through the pipe 6 to the nozzle 1, thereby resulting in a richer mixture in the manifold 2, whereas clockwise movement of the lever 25 about its pivot 26 results in less fuel being pumped to the nozzle 1, thereby resulting in a weaker mixture in the manifold 2.

In the operation of the fuel injection control arrangement just described when starting from cold, the cold start enrichment control lever is pulled out thus causing the arm 31 to swing in a clockwise direction about its pivot 32, and thus causing the extension 30 to contact the extension 29 of the pump output control lever 25, and to move the latter in an anti-clockwise direction about its pivot 26. The engine is then switched on, and when it turns, the pump 5 will pump fuel through the pipe 6 to the nozzle 1 so as to result in a rich mixture in the manifold 2. As soon as the engine has started, the cold start enrichment control lever may be replaced by releasing it, and the engine fuel requirements will be controlled by the automatic fast idle and enrichment control device 44. The control side of the diaphragm unit 36 is in communication with the atmosphere through the pipe 43 and the port 53 in the stub pipe 52 of the cylindrical housing 51 of the control device. Under these conditions, the diaphragm holds the adjustable operating link 35 in a lower position, so that the part load cam 22 maintains the pump output control lever in a position where it controls the pump in such a way that a sufficiently rich mixture is fed into the manifold 2 during the warming up period. As the engine warms up, and heats the water in the cylinder head 48, the thermostatic control element operates to move the thrust rod 49 outwardly, thereby causing the slide valve member to close the pipe 43 and eventually the pipe 45 and the stub pipe 52, thus disconnecting the control side of the diaphragm from the atmosphere. By arranging for the slide valve member to close the pipe 43 before closing the pipe 45 and the stub pipe 52, fast idle conditions exist for a short time after the enrichment pipe 43 has been closed so that the transition from fast idle and enrichment control of the engine to part load control is more gradual than would otherwise be the case, thereby preventing or minimizing the risk of stalling the engine. If desired, a further spring may be provided in the housing 51 coaxial with the spring 47 for providing further control of the slide valve member after it has closed the pipe 43 and during the period when it is closing the pipe 45 and the stub pipe 52. The control side of the diaphragm now becomes governed by the reduced pressures obtaining in the manifold 2 through the pipe 37, the bleed valve 39 being closed during all these operations. The reduced pressures obtaining in the manifold 2 cause the diaphragm to rise, thus lifting the operating link 35 and the part load cam 22 and allowing the pump output control lever to move in a clockwise direction, whereby the fuel input to the engine is reduced to suit the engine fuel requirements at normal working temperature.

As the speed of the engine rises, the governor in the housing 7 pushes the thrust pin 8 outwardly of the housing, thus causing the bell crank 10 to turn in an anti-clockwise direction. The cam follower 12 acting on the cam surface 14 causes the cam arm 15 to pivot in a clockwise direction about its pivot 16, thereby pulling the adjustable link 18 to the right (as shown in the drawing). Movement of the link 18 to the right causes the arm 19 to swing in an anti-clockwise direction about its pivot 20, thus pulling the part load cam 22 to the right and allowing the pump output control lever 25 to move further in a clockwise direction so as to reduce the fuel input to the engine.

It will be appreciated that, during the part load fuel requirements of the engine, movement of the pump outlet control lever 25 is governed mainly by the diaphragm unit acting through the link 35 on the part load cam 22, and that, during full load requirements of the engine, the movement of the pump output control lever 25 is governed by the governor 7 acting through the bell crank 10, cam arm 15 and the link 18 on the part load cam 22. The cam surface 14 and the part load cam 22 are designed in accordance with the pump output characteristics, and the fuel requirements of the engine so as to match the pump output with the engine requirements as described above.

At high speeds under full load conditions, the fuel requirements of the engine become less as shown in FIGURE 2. The full load fuel requirements are controlled from the governor 7. However in the part load (⅔ load) speed range it will be seen from FIGURE 2 that there is a decreasing fuel requirement as the engine speed increases from 1000 to 2500 r.p.m., and an increasing fuel requirement as the speed rises above 2500 r.p.m. There is little change in the manifold depression throughout the speed range of the engine at any constant B.M.E.P. or torque loading, so that there is consequently little change of depression on the control side of the diaphragm which influences the part load cam 22. Therefore, in order to meet the part load fuel requirements from approximately 2500 r.p.m. onwards (these requirements being contrary to the full load fuel requirements) a compensating device is necessary, and it is for this reason that the bleed valve 39 is provided. As the arm 19 swings in an anti-clockwise direction about its pivot 20 it will contact the operating member 40 for the bleed valve 39 and push the operating member 40 to the right, thus opening the bleed valve and connecting the control side of the diaphragm to atmosphere, thereby permitting the diaphragm to drop and cause the link 35 to move the part load cam 22 in such a way as to swing the pump output control lever in an anti-clockwise direction about its pivot 26.

It is to be appreciated that the bleed valve 39 will also be operated by the arm 19 when the engine is operating at full load, but in such a case the bleed valve will be ineffective as there is no manifold depression to be varied.

While the fuel injection control system illustrated in the drawings has only one fuel injection nozzle, it is to be appreciated that any desired arrangement of nozzles may be employed, and that the arrangement is in no way dependent upon the position and number of the injection nozzles. For example, the injection nozzle 1, may be positioned so as to inject the fuel towards the throttle plate 3, so that the pipes 6 and 37 will effectively be interchanged.

Under certain conditions it may be desirable to have a mechanically operated valve controlled by the throttle linkage for connecting the control side of the diaphragm to atmosphere for the purpose of giving further enrichment to accommodate the engine fuel requirements at the part load higher B.M.E.P. and speed range.

Having thus described the invention, what is claimed as new and desired to be secured by Letters Patent, is:

1. An arrangement for injecting controlled quantities of fuel into the air manifold of an internal combustion engine, wherein a pump is arranged to inject fuel into said air manifold via at least one nozzle arranged in the wall thereof, and wherein the output of the pump is controlled in accordance with the full load requirements of the engine, by first means responsive to engine speed and by second means responsive to a combination of engine speed and the pressures obtaining in the manifold in accordance with the part load requirements of the engine, both said means being interdependent and so arranged that, when the engine is operating at part load, the pump output is controlled by said first and second means, and that, when the engine is operating at full load, the pump output is controlled by said first means only.

2. An arrangement as claimed in claim 1, wherein said first means comprise a cam and lever mechanism arranged to move an output control lever of the pump in response to movements of an engine governor which is itself responsive to engine speeds, and wherein the second means comprise a diaphragm unit responsive to pressures obtaining in the manifold, the diaphragm of such unit being arranged to move the pump output control lever through a cam and linkage mechanism.

3. An arrangement as claimed in claim 2, wherein the pump output control lever has a cam follower coacting with the cam of the cam and linkage mechanism associated with the diaphragm unit, such cam being controllable through a linkage mechanism and the cam and lever mechanism associated with the engine govenor.

4. An arrangement as claimed in claim 2, wherein the control side of the diaphragm of the diaphragm unit is connected to the air manifold of the engine, so that the control side of the diaphragm will be influenced by the reduced pressures obtaining in the manifold when the engine is in operation, and wherein the control side of the diaphragm of the diaphragm unit is also connected to a bleed valve having an adjustable operating member actuable by a member of the combined cam and linkage system which serves to operate the pump output control lever.

5. An arrangement as claimed in claim 2, wherein the control side of the diaphragm of the diaphragm unit is connected through a fast idle and enrichment control device to the air manifold, the fast idle and enrichment control device including a connection between the control side of the diaphragm and atmosphere, and means resonsive to the heat of the engine as the latter heats up to close such connection.

6. A control device for controlling the supply of fuel to an internal combustion engine having an inlet suction manifold, a variable output fuel pump for supplying fuel to said engine, and engine speed responsive means including a member displaceable in accordance with engine speed connected to said variable output pump to vary the output thereof in accordance with movement of said displaceable member, comprising a displaceable control diaphragm having a first side connected to said variable output pump and movable when effective to vary the output of said pump in addition to said engine speed responsive means, said diaphragm having a second side communicating with and subjected to pressure of said inlet manifold, means communicating said first diaphragm side to atmosphere to negate the action on said diaphragm by the operating pressure in said inlet manifold, and means to disconnect said means communicating said first diaphragm side to atmosphere to make said diaphragm effective and movable in response to the pressure in said inlet manifold to vary the output of said fuel pump.

7. A control device according to claim 6, wherein said means to disconnect said means communicating said first diaphragm side to atmosphere includes means responsive to the operating temperature of said internal combustion engine.

8. A control device according to claim 7, wherein said means responsive to the operating temperature of said internal cumbustion engine includes a thermostat.

9. A control device according to claim 8, wherein said thermostat is disposed so as to be in contact with the cooling water in the cylinder head of said engine.

10. A control device according to claim 6, wherein said means to disconnect said means communicating said first diaphragm side to atmosphere includes a control cylinder, a valve slidable in said cylinder, a first conduit connecting said control cylinder and said second side of said diaphragm, and means to displace said piston valve in said cylinder in accordance with the operating temperature of said engine.

11. A control device according to claim 10, including a second conduit connecting said inlet manifold and said control cylinder at a spaced location from said first conduit connection, said valve being movable to first cover said first conduit and then said second conduit.

12. A control device according to claim 6, including a control lever connected to said engine speed responsive means and to said variable output fuel pump, said second side of said diaphragm being also connected to said control lever to superimpose the control of the output of said variable output pump when said diaphragm is effective.

13. A control device according to claim 6, wherein said variable output pump includes a control lever pivotally mounted on said pump, a pivotal control cam on said pump arranged in bearing contact with said lever, and wherein means connecting said first side of said diaphragm to said variable output pump is connected to said pivotal cam member to shift said cam member and said control lever on said pump.

14. A control device for controlling the supply of fuel to an internal combustion engine having an inlet suction manifold, comprising a variable output pump including injection means disposed to inject fuel into said manifold, a control lever mounted on said pump and being pivotal to vary the output of said pump, a control cam pivotally mounted on said pump and having a portion in contact with said control lever, a governor connected to said engine and having a member displaceable in accordance with the speed of said engine, a governor lever pivotally mounted on said governor and connected to said pivotal cam and said displaceable member to shift said cam and said control lever to vary the output of said pump in accordance with the speed of said engine, a diaphragm control member including a first side connected to said pivotal cam member, said cam member being movable thereby when said diaphragm member is effective, whereby to superimpose the action of said governor on the control of the output of said pump, said diaphragm having a second side exposed to the pressure of said inlet manifold, means communicating said second diaphragm side to atmosphere to negate the action of said second diaphragm by the operating pressure of said inlet manifold, and means to disconnect said means communicating said second diaphragm side to atmosphere to make said diaphragm effective and movable in response to the pressure in said inlet manifold whereby to vary the output of said fuel pump.

References Cited in the file of this patent

UNITED STATES PATENTS

| | | |
|---|---|---|
| 2,213,683 | Benning | Sept. 3, 1940 |
| 2,245,562 | Becker | June 17, 1941 |
| 2,341,257 | Wunsch | Feb. 8, 1944 |
| 2,588,952 | Baisch | Mar. 11, 1952 |
| 2,673,556 | Reggio | Mar. 10, 1954 |
| 2,841,129 | Reggio | July 1, 1958 |